Feb. 27, 1923.
E. W. DOERING.
SAND VALVE.
FILED MAY 1, 1920.
1,446,842.
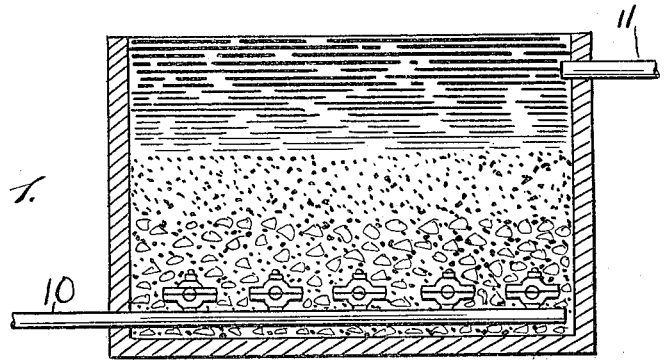
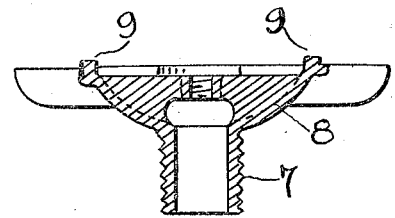
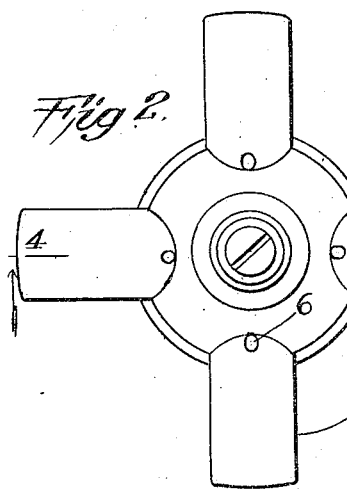
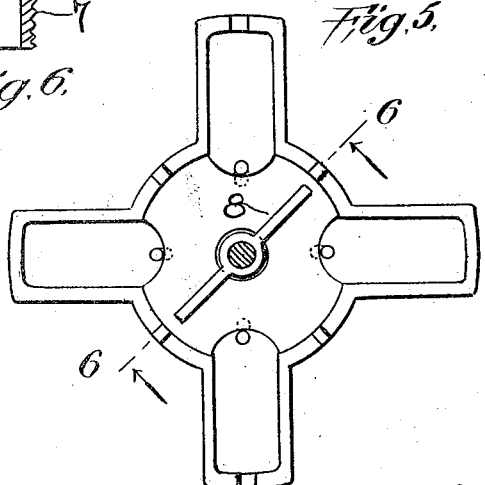
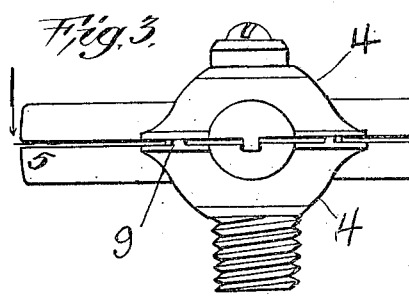
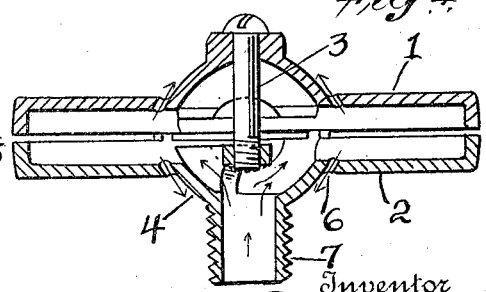
Inventor
Emil W. Doering
By his Attorney
Samuel G. Darby Patented Feb. 27, 1923.

1,446,842

UNITED STATES PATENT OFFICE.

EMIL W. DOERING, OF FLORENCE, MASSACHUSETTS.

SAND VALVE.

Application filed May 1, 1920. Serial No. 378,317.

*To all whom it may concern:*

Be it known that I, EMIL W. DOERING, a citizen of the United States, and a resident of Florence, in the county of Hampshire and State of Massachusetts, have invented a certain new and useful Improvement in Sand Valves, of which the following is a specification.

This invention relates to sand valves for use in the purification of water and other liquids as applied in filter apparatus and the like.

The objects of my invention are to provide a simple, rugged structure which is economic of construction, readily applied, easily accessible for cleaning or inspection, and which is highly efficient in operation.

As will appear hereinafter, my device and its arrangement in the filter, vat or room, provides means for increasing the filter capacity of the apparatus, and by reversing the direction of the flow of the water or liquid through the valve and filter, permits the filter bed to be washed and freed from impurities which collect on the filter bed during the process of filtering.

The invention consists in the various arrangements of parts and details of construction as hereinafter set forth, and, more particularly, as pointed out in the appended claims.

I attain these objects by the device illustrated in the accompanying drawing, of which—

Fig. 1 is a side elevation, partly in section, showing the application of my device in a filter apparatus or other suitable vat or room;

Fig. 2 is a plan view of my sand valve;

Fig. 3 is a side elevation of the same;

Fig. 4 is a sectional view taken on the line 4—4 of Fig. 2;

Fig. 5 is a view taken on the line 5—5 of Fig. 3; and

Fig. 6 is a view taken on the line 6—6 of Fig. 5.

Similar numerals refer to similar parts throughout the several views.

I will now describe my sand valve. This device consists essentially of an upper part 1 and a corresponding lower part 2 held together by the screw 3. As shown in the drawing, my preferred form of construction consists of hollow central portions 4 having hollow radial arms 5 and provided with openings 6. The lower part 2 is provided with a screw threaded pipe connection 7 and a bridge 8, as is shown more particularly in Figs. 4, 5 and 6. The screw 3 fits into the threaded portion of bridge 8 and holds the two parts 1 and 2 together in spaced relation. In order to provide such suitable spaced relation between parts 1 and 2, lugs 9—9 are provided. While I have shown a dome shaped construction of parts 1 and 2 provided with four radial arms 5 and openings 6, obviously my invention permits of the use of other construction, as more or fewer arms and openings might be provided if desired. It may here be noted that bridge 8 serves the double function of affording an anchor seat for screw 3 and at the some time serves also as a means for deflecting the inflowing wash water, as will be more fully stated below.

My sand valve may be used as shown in Fig. 1, where the screw threaded parts 7 are tapped into a pipe 10 which is located at or near the bottom of the filter, vat or room. Any desired number of valves may be attached to a single pipe and more than one pipe may be used if desired. Immediately covering the sand valve or valves a suitable filter material is used, such as charcoal, broken quartz, gravel, or the like, and this may be covered with a finer filter material as occasion may require. The water or liquid to be filtered may be supplied by pipe 11 and is permitted to percolate through the filter bed, then through the sand valves and out through a pipe 10. The openings in the sand valves offer increased drainage area, as the filtered water or other liquid readily passes through the peripheral slits and openings and thence out through pipe 10. I find that by the use of my sand valve a larger amount of liquid may be filtered in a given time and the capacity can be regulated by the number of valves employed. It is also found that when the filter bed becomes contaminated with a layer of sediment or the like, said bed may be readily cleansed by reversing the flow of water and forcing the liquid into pipe 10, through the stem of the sand filter 7 where, by means of bridge 8 the liquid is deflected and permitted to gently pass out through the openings 6 and through the lateral peripheral openings between parts 1 and 2. In this manner the impurities may be quickly and easily removed from the filter bed, without disturbing the filter material thereof.

Having thus described my invention, what I claim as new and useful and desire to secure by Letters Patent is:—

1. In a device of the character described a dome-shaped upper body portion provided with radially extending arms, a corresponding lower body portion and radially extending arms, said arms being provided with apertures, means for holding said upper and lower body portions and arms in spaced relation, and means for removably fastening together said body portions and said arms.

2. In a device of the character described, a dome-shaped upper body portion provided with radially extending arms, a corresponding lower body portion and radially extending arms, said arms being provided with apertures, means for holding said upper and lower body portions and arms in spaced relation, means for removably fastening together said body portions and arms, and means for anchoring said device to an open pipe support.

3. In a device of the character described, an upper body portion provided with radially extending arms, a corresponding lower body portion and radially extending arms, said lower body portion being provided with a hollow screw tap and a bridge extending across the body portion.

4. In a filter apparatus comprising a liquid receiving receptacle, a hollow pipe extending along the bottom of said receptacle and having one end projecting through the wall of the same, a series of sand valves mounted on said pipe in spaced relation comprising hollow body portions and arms in spaced relation and provided with apertures for receiving filtered liquid.

5. In a filter apparatus comprising a liquid receiving receptacle, a hollow pipe extending along the bottom of said receptacle having one end projecting through the wall of the same and a series of sand valves mounted on said pipe comprising hollow body portions and radial arms in spaced relation and provided with apertures for discharging flush water to cleanse the filter bed.

In testimony whereof I have hereunto set my hand on this 27th day of April A. D., 1920.

EMIL W. DOERING.